United States Patent [19]
Lipkin et al.

[11] Patent Number: 6,138,235
[45] Date of Patent: Oct. 24, 2000

[54] CONTROLLING ACCESS TO SERVICES BETWEEN MODULAR APPLICATIONS

[75] Inventors: Efrem Lipkin, Berkeley; Theodore C. Goldstein, Palo Alto, both of Calif.

[73] Assignee: Sun Microsystems, Inc., Palo Alto, Calif.

[21] Appl. No.: 09/106,567

[22] Filed: Jun. 29, 1998

[51] Int. Cl.$^7$ .................................................. H04R 25/00
[52] U.S. Cl. ........................ 713/155; 713/176; 713/150; 713/169; 713/175; 380/255; 380/277
[58] Field of Search ..................... 380/255, 277, 380/282; 713/150, 155, 156, 169, 175, 176, 180, 200, 201

[56] References Cited

U.S. PATENT DOCUMENTS

| | | | |
|---|---|---|---|
| 5,218,637 | 6/1993 | Angebaud et al. | 380/23 |
| 5,642,419 | 6/1997 | Rosen | 380/23 |
| 5,649,099 | 7/1997 | Theimer et al. | 395/187.01 |
| 5,823,726 | 11/1998 | Shwed et al. | 709/229 |
| 5,933,503 | 8/1999 | Schell et al. | 380/25 |
| 5,991,399 | 11/1999 | Graunke et al. | 380/4 |
| 6,002,767 | 12/1999 | Kramer | 380/24 |
| 6,002,768 | 12/1999 | Albanese et al. | 380/25 |
| 6,055,236 | 4/2000 | Nessett et al. | 370/389 |

OTHER PUBLICATIONS

U.S. Pat. Application, entitled "Permit for Controlling Access to Services in Protected Memory Systems," to Efrem Lipkin and Theodore C. Goldstein, Filed Jun. 18, 1998, Ser. No. Not Yet Assigned.

Wallach D S et al: "Extensible security architectures for Java" Proceedings of the ACM Symposium on Operating Systems Principles, 1997, pp. 1–26 14, XP002101681; p. 5, line 7—p. 7, line 11; p. 8, line 9—p. 10, line 13; p. 14, line 1—line 14.

Gong L et al: "Going beyond the sandbox: an overview of the new security architecture in the Java/sup TM/Development Kit 1.2". Stahl und Eisen, pp. 103–112 110, XP002100907. ISSN: 0340–4803 "the whole document".

*Primary Examiner*—Thomas R. Peeso
*Attorney, Agent, or Firm*—Park & Vaughan LLP

[57] ABSTRACT

The present invention provides a method and an apparatus for providing a first computer program module with the ability to access a service from a second computer program module. The method includes receiving the first computer program module—for example, at a third party computer system, and determining whether the first computer program module has been digitally signed by an authority having power to confer access for the service. If so, the method provides the first computer program module with access to the service. A variation on this embodiment includes verifying that the first computer program module includes a chain of certificates establishing a chain of authorization for the service. This verification process includes verifying that a first certificate in the chain is signed by an entity that is originally authorized to confer access for the service, and verifying that subsequent certificates in the chain are signed by entities that have been delegated authorization to confer access for the service. In a further variation on the above embodiment, the act of providing the first computer program module with access to the service, includes providing the first computer program module with a permit that allows the first computer program module to perform a restricted set of operations on the service.

29 Claims, 5 Drawing Sheets

CONTROLLING ACCESS TO SERVICES BETWEEN MODULAR APPLICATIONS

BACKGROUND

The present invention relates to protection mechanisms in computer systems. More specifically, the present invention relates to a method and an apparatus for controlling access to services.

Programming languages such as the Java™ programming language (developed by SUN Microsystems, Inc. of Palo Alto, Calif.) and associated supporting interfaces presently provide a reliable and secure infrastructure to support the transfer of an application across a computer network, and to run the application on a wide range of computing platforms. Because of developments such as Java, it is becoming increasingly common to load an application, such as a Java applet, from a remote server onto a local machine, and to execute the application on the local machine.

However, present computing systems are not designed to allow computer applications from different vendors to interact with each other in a controlled way so that the applications can work together to accomplish a given task. In particular, these systems do not facilitate sharing of data and functions. For example, it may be useful for a tax application to access capital gains information from a home brokerage application. However, the home brokerage application needs to protect the privacy of the customer's portfolio. Hence, the tax application cannot be given unrestricted access portfolio data from the home brokerage application.

Additionally, software vendors may want to enforce contractual arrangements between complementary applications. For example, a home brokerage application may want to tap into historical pricing information supplied by an application from a financial institution. This arrangement would be facilitated if the vendor of the home brokerage application would establish a contractual arrangement with the financial institution that allows the home brokerage application to access the historical pricing information.

Unfortunately, present computing systems lack any mechanism for facilitating and controlling access to services provided by other applications. In particular, with present systems it is not possible to identify applications that have been granted rights to access services from other applications, nor to control what services a given application can have performed.

SUMMARY

The present invention provides a method and an apparatus for providing a first computer program module with the ability to access a service from a second computer program module. The method includes receiving the first computer program module—for example, at a third party computer system, and determining whether the first computer program module has been digitally signed by an authority having power to confer access for the service. If so, the method provides the first computer program module with access to the service. A variation on this embodiment includes verifying that the first computer program module includes a chain of certificates establishing a chain of authorization for the service. This verification process includes verifying that a first certificate in the chain is signed by an entity that is originally authorized to confer access for the service, and verifying that subsequent certificates in the chain are signed by entities that have been delegated authorization to confer access for the service.

In a further variation on the above embodiment, the act of providing the first computer program module with access to the service, includes providing the first computer program module with a permit that allows the first computer program module to perform a restricted set of operations on the service.

In another variation on the above embodiment, the first computer program module and the second computer program module can interact with each other on a third party computer system. In this case, the first computer program module is transferred from a first server to the third party system, and the second computer program module is transferred from a second server to the third party system. This allows the first computer program module and the second computer program module to interact with each other on the third party system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

For purposes of this detailed disclosure the following terminology is used. (1) A "Java Archive file" can be a file containing modular bodies of Java™ code in addition to resources, such as graphics or audio files. (2) A "computer readable storage medium" can be any device or medium that can store code and/or data for use by a computer system. This includes, but is not limited to, magnetic and optical storage devices such as disk drives, magnetic tape, CDs (compact discs) and DVDs (digital video discs), or alternatively, computer instruction signals embodied in a carrier wave. (3) A "computer program module" can be a module including a collection of instructions that can be executed by a computer. These instructions may comprise an entire computer program, or merely a piece of a computer program. A computer program module often exists in a form that facilitates downloading onto a computer system across a computer network. For example, a computer program module may take the form of a Java™ Applet. (4) An "entity" can be a human being, a computer program or a computer system, that has the power to confer access rights for a service, and optionally the ability to delegate such power to other entities. (5) A "service" can include a single service or a plurality of services. Therefore, the act of conferring access for a service can also confer access to a plurality of services.

Computer System

Figure 1:
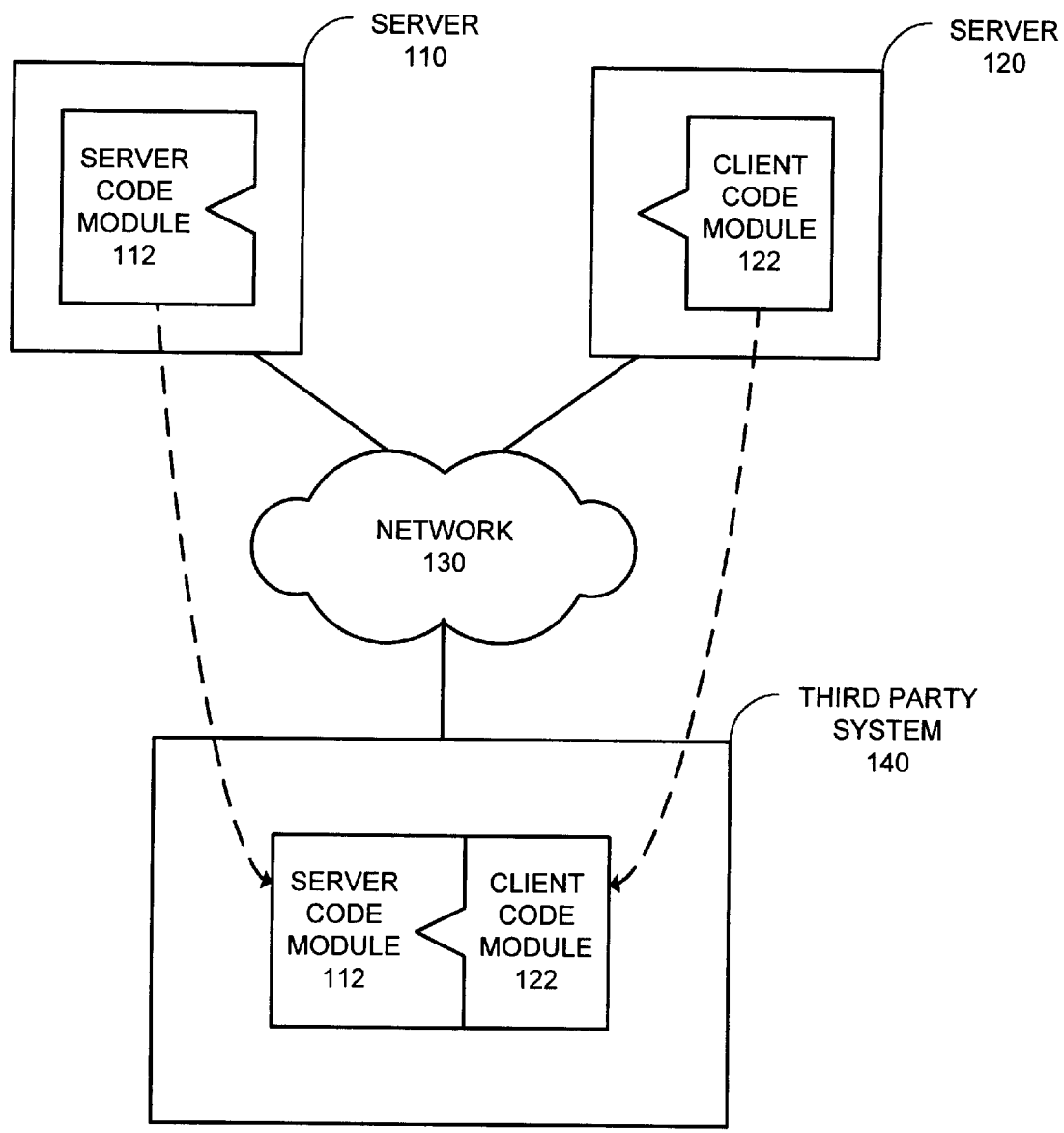
FIG. 1 illustrates a number of computer nodes coupled together through a network 130 in accordance with an embodiment of the present invention.

FIG. 1 illustrates a number of computer nodes coupled together through a network 130 in accordance with an embodiment of the present invention. In FIG. 1, servers 110 and 120 are coupled to third party system 140 through network 130. A computer node can be any computation device that can be coupled to a computer network. A computer node may include, but is not limited to, a personal computer, a workstation, a mainframe computer, a portable computer or a device controller. Network 130 generally refers to any type of wire or wireless link between computers, including, but not limited to, a local area network, a wide area network, or a combination of networks. In one embodiment of the present invention, network 130 includes the Internet. Servers 110 and 120 can be any nodes on a computer network including a mechanism for servicing requests from a client for computational or data storage resources. Third party system 140 may be any node a computer network communicating with servers 110 and 120 that is able to download code and/or data from servers 110 and 120.

In the embodiment illustrated in FIG. 1, server 110 contains server code module 112, and server 120 contains client code module 122. For purposes of this detailed disclosure, a server code module is a module including code that provides a service to a client code module, and a client code module is a module including code that requests a service from a server code module. Server code module 112 and client code module 122 include modular pieces of code that can operate together on third party system 140. The dashed lines on FIG. 1 represent server code module 112 and client code module 122 being downloaded onto third party system 140 across network 130. This downloading process can take place in a number of ways. In one embodiment of the present invention, server 110 includes a web site that can be accessed by a user on third party system 140 to download server code module 112 onto third party system 140. Correspondingly, server 120 includes a web site that can be accessed by a user on third party system 140 to download client code module 122 into third party system 140. In another embodiment, server code module 112 and client code module 122 are not downloaded across network 130. Instead, they are transferred from servers 110 and 120, respectively, to third party system 140 by way of computer storage media, such as a computer disk.

Once server code module 112 and client code module 122 are located on third party system 140, they can be integrated to work together as is illustrated in FIG. 1. For example, in providing a service to client code module 122, server code module 112 might retrieve data from a database for client code module 122. Alternatively, server code module 112 might perform a computational operation for client code module 122. This integration process may involve determining whether client code module 122 has been conferred the right to access services from server code module 112. In the reverse direction, this process may involve determining whether server code module 112 has been conferred the right to access services from client code module 122.

Access Model

Figure 2:
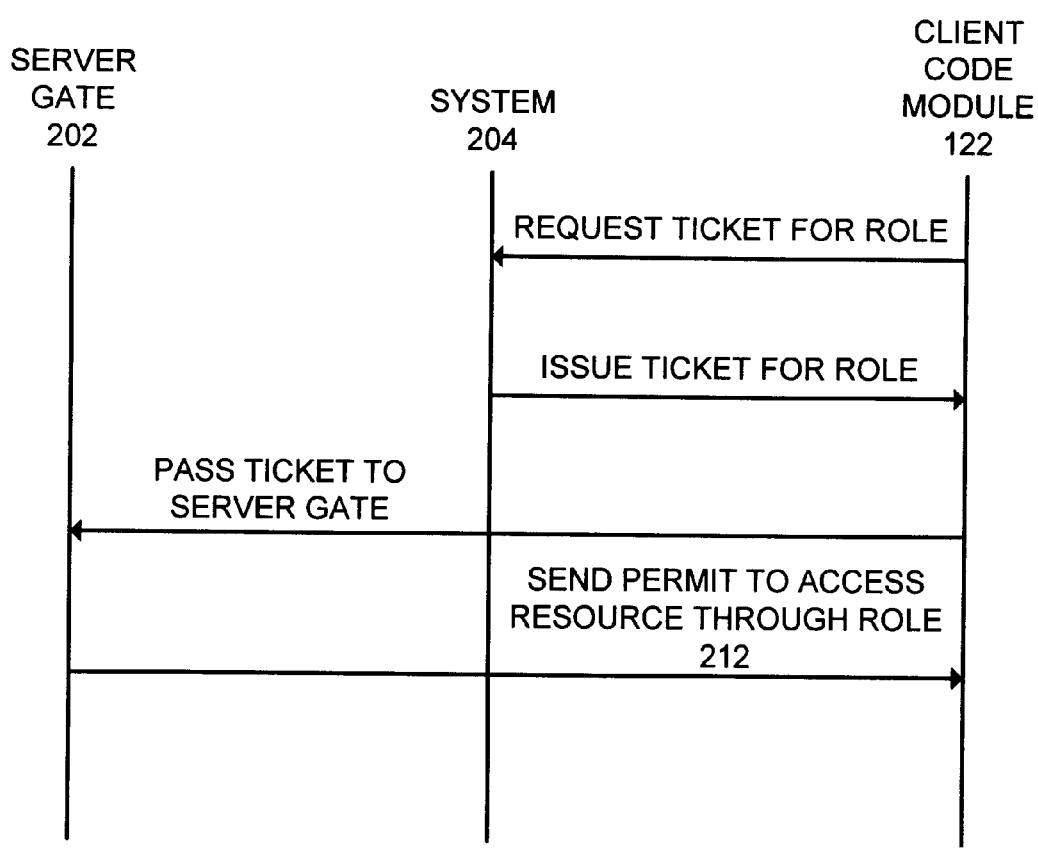
FIG. 2 illustrates the process of receiving access to a service in accordance with an embodiment of the present invention.

FIG. 2 illustrates the process of accessing a service in accordance with an embodiment of the present invention.

FIG. 2 illustrates interactions between server gate 202, system 204 and client code module 122 (from FIG. 1). Server gate 202 includes an access mechanism that controls access to services provided by server code module 112 (from FIG. 1). In one embodiment of the present invention, server gate 202 is located within server code module 112 on third party system 140. In another embodiment, server gate 202 is located within server 110 itself, and is accessed via communications across network 130. System 204 includes a mechanism for establishing that client code module 122 is properly authorized to access services provided by server code module 112. To this end, system 204 is implemented in a number of ways. In one embodiment, system 204 is implemented by code that is part of third party system 140. In another embodiment, system 204 may be implemented as part of server code module 112 within third party system 140.

The process illustrated in FIG. 2 operates as follows. Client code module 122 is assumed to already exist within third party system 140. In order to access a desired service, client code module 122 requests a "ticket" for a "role" to access a collection of services from server code module 112. (For purposes of this detailed disclosure, a ticket is an object that cannot be forged that indicates that the holder of the object has been signed to use certain services.) A role defines a set of operations to be performed by server code module 112. Certain roles may be more limited than other roles. For example, if server code module 112 maintains a computer file system, one role may include only the operation of reading a file from the file system. Another more powerful role may include the operations of reading, writing and deleting files from the file system.

In response to the request, system 204 examines client code module 122 to determine if client code module 122 includes proper authorization for the role. In one embodiment of the present invention, this examination includes examining a certificate chain 310 (illustrated in FIG. 3) to ensure that certificate chain 310 has been properly signed by a chain of authorities. This process is described in more detail below with reference to FIGS. 3–5.

If client code module 122 is properly authorized for the role, system 204 issues a ticket for the role, and this ticket is given to client code module 122. Next, client code module 122 passes the ticket to server gate 202. Server gate 202 checks the ticket to ensure that the ticket is valid. If it is valid, server gate 202 sends a permit for the service to client code module 122. (For purposes of this detailed description, a permit is a proxy or a capability giving a holder of the permit access to a service or a group of services.) This permit allows client code module 122 to access the services defined by the role. In one embodiment of the present invention, this permit is an object defined within an object-oriented programming system. This object allows client code module 122 to perform a set of methods that comprise the role. After the permit is sent, server gate 202 invalidates the ticket, so that it cannot be used again. Since client code module 122 remains in possession of the permit, client code module 122 will be able to access services using the permit, and hence, no longer needs the ticket.

Client Code Module

Figure 3:
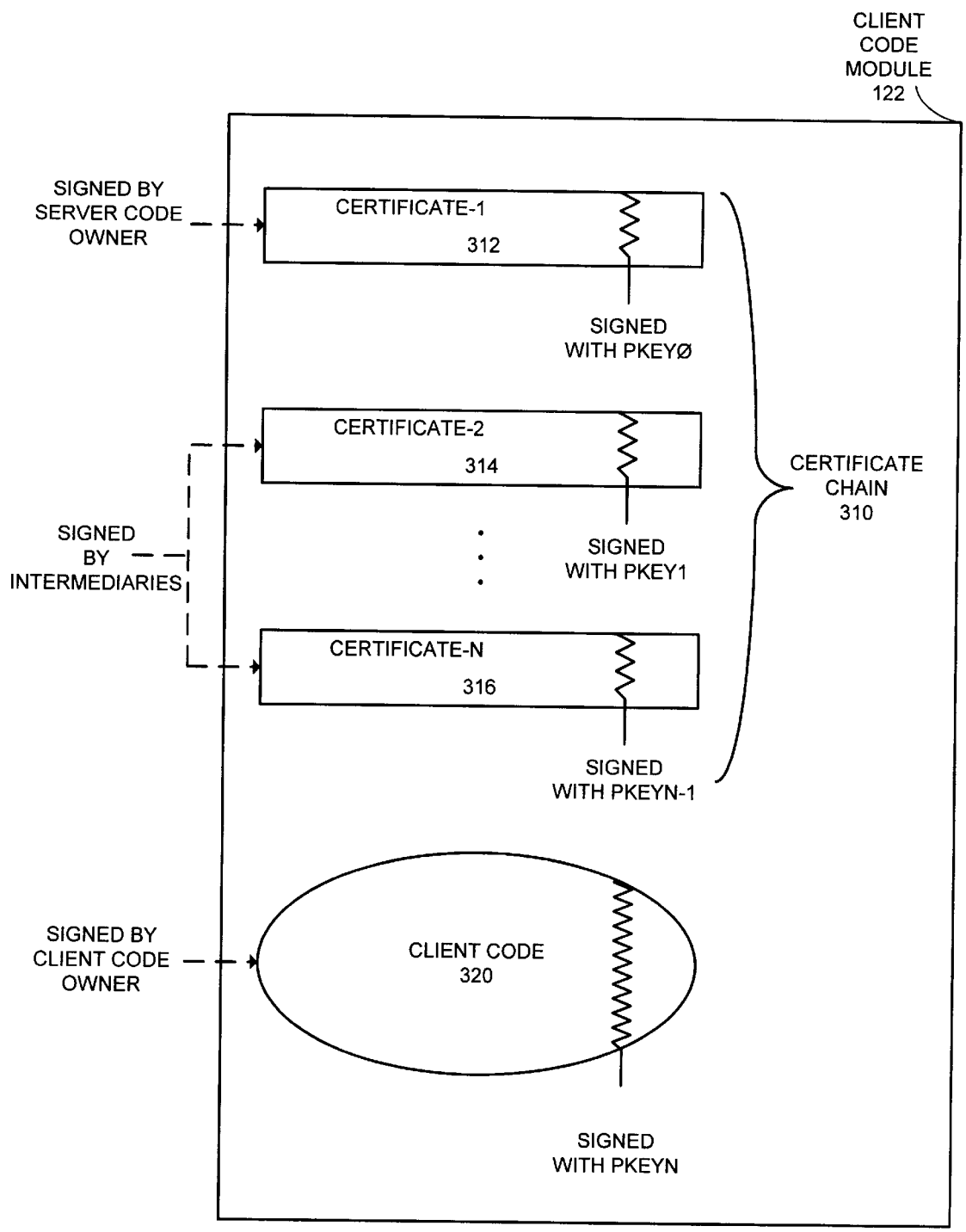
FIG. 3 illustrates part of the structure of client code module 122 from FIG. 1 in accordance with an embodiment of the present invention.

FIG. 3 illustrates part of the structure of client code module 122 from FIG. 1 in accordance with an embodiment of the present invention. Client code module 122 includes certificate chain 310 and client code 320. Certificate chain 310 includes a chain of certificates that establishes a chain of authorization for the service. The first certificate in the chain is signed by an entity that is originally authorized to confer access for the service, and subsequent certificates in the chain are signed by entities that have been delegated authorization to confer access for the service from preceding entities in the chain.

For purposes of this detailed disclosure, a certificate is a signed electronic document that certifies that something is true. A certificate typically indicates that someone has ownership of a public key. In the present invention, a certificate can indicate that an entity can have access to services represented by a key. A certificate may include the identity of a signing authority as well as a digital signature produced with a private key (that can be validated with a corresponding public key). For example, one certificate format is defined under the X.509 standard.

For purposes of this detailed disclosure, a digital signature is a value derived from a file using a secret such that it can be demonstrated that the value was derived using the secret, wherein the secret is known only to the signer. A digital signature may take the form of a message digest produced by the key and appended to the file, or may take the form of a transformation of data within the file using the key. A digital signature may also take the form of a message digest encrypted by the private key of a public key private key cryptography system.

For example, in the illustrated embodiment certificate chain 310 includes certificate-1 312, certificate-2 314 and certificate-N 316. A server code owner initially starts with a private key zero. In order to pass along authority for a role, the server code owner generates a certificate-1 312 and an associated public key private key pair, the private key being private key one. The server code owner signs certificate-1 312 with private key zero and passes certificate-1 312 along with the corresponding private key one to a first intermediary. The first intermediary generates certificate-2 314 along with a corresponding public key private key pair, including private key two. The first intermediary signs certificate-2 314 with private key one and passes certificate-2 314, along with the associated private key two and all previous certificates in the chain, to a following intermediary. This pattern continues up the chain until a final intermediary signs certificate-N 316 with private key N-1 and passes the certificate-N 316, along with corresponding private key N and all previous certificates in the chain, to a client code owner. The client code owner uses private key N to sign client code 320, and then generates client code module 122, which includes certificate chain 310 and client code 320.

Hence, client code module 122 includes a verifiable chain of certificates 310 signed by intermediaries from the server code owner to the ultimate client code owner. Certificate chain 310 can be verified by using the public keys to verify that certificates in the chain are properly signed with their corresponding private keys.

Delegation of Authority

Figure 4:
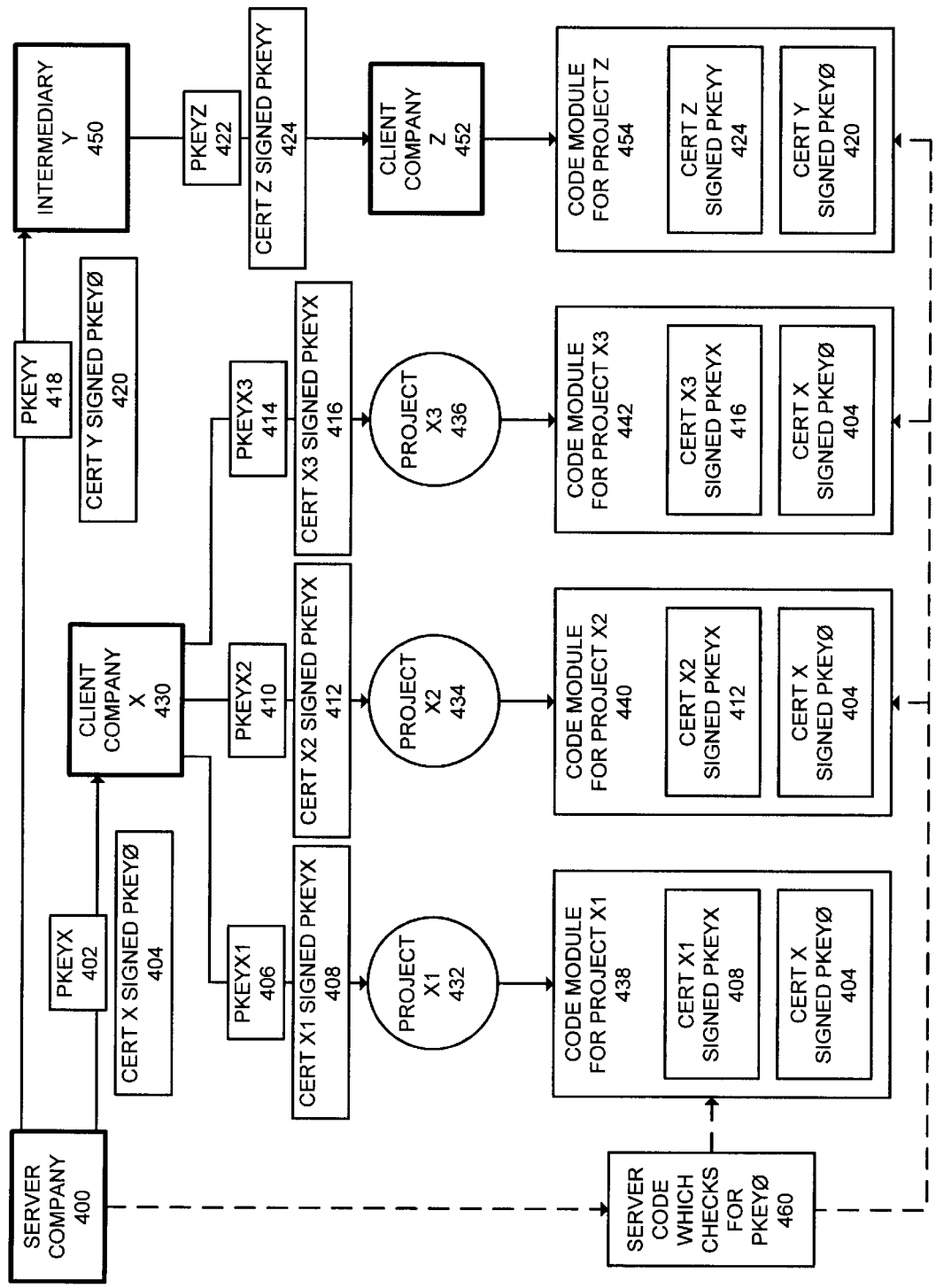
FIG. 4 illustrates how authority to access a service is transferred between different entities using a chain of certificates in accordance with an embodiment of the present invention.

FIG. 4 illustrates how authority to access a service is delegated between different entities using a chain of certificates in accordance with an embodiment of the present invention. In this example, server company 400 delegates authority to access data associated with a server code module, such as server code module 112 in FIG. 1. This server code module is distributed to various third party systems, and can interact with properly authorized client code modules on these third party systems. Alternatively, the server code module can interact with client codes modules on computer systems belonging to either server company 400 or to the owners of the client code modules.

In the example illustrated in FIG. 4, server company 400 does the following. First, server company 400 generates a public/private key pair, including private key zero. Next, server company 400 generates server code 460, which checks to see that client code modules include a chain of certificates, including a root certificate signed with private key zero. Second, server company 400 generates a certificate and a public/private key pair for each intermediary or client company that it desires to delegate authority to. Third, it sends the certificate signed with private key zero and the private key associated with the certificate to the intermediary or client company. In the illustrated example, server company 400 sends certificate X 404 (signed with private key zero) and private key X 402 to client company X 430. Server company 400 additionally sends certificate Y 420 (signed with private key zero) and private key Y 418 to intermediary Y 450.

In the example illustrated in FIG. 4, client company X 430 generates certificates and public/private key pairs for each of three projects, and passes the certificates and associated private keys to entities within client company X 430 that are responsible for producing three different client code modules. In particular, client company X 430 passes certificate X1 408 (signed with private key X) and private key X1 406 to project X1 432. Client company X 430 also passes certificate X2 412 (signed with private key X) and private key X2 410 to project X2 434. Client company X 430 additionally passes certificate X3 416 (signed with private key X) and private key X3 414 to project X3 436.

Next, each project within client company X 430 creates a code module. In particular, project X1 432 creates a code module 438 for project X1. This code module includes a chain of certificates, including certificate X 404 (signed with private key zero) and certificate X1 408 (signed with private key X 402). Code module 438 also includes code (not shown) that is signed with private key X1 406. Project X2 434 creates code module 440 for project X2. This code module includes a chain of certificates, including certificate X 404 (signed with private key zero) and certificate X2 412 (signed with private key X 402). Code module 440 also includes code (not shown) that is signed with private key X2 410. Project X3 436 creates code module 442 for project X3. This code module includes a chain of certificates, including certificate X 404 (signed with private key zero) and certificate X3 416 (signed with private key X 402). Code module 442 also includes code (not shown) that is signed with private key X3 414.

In the example illustrated in FIG. 4, intermediary Y 450 generates a certificate Z 424 and a public/private key pair, including private key Z 422. Intermediary Y 450 signs certificate Z 424 using private key Y 418 and passes certificate Z 424 (signed with private key Y 418) along with private key Z 422 to client company Z 452.

Client company Z 452 creates code module 454 for project Z, which includes a chain of certificates, including certificate Y 420 (signed with private key zero) and certificate Z 424 (signed with private key Y 418). Code module 454 also includes code (not shown) that is signed with private key Z 422.

Delegation and Authorization Process

Figure 5:
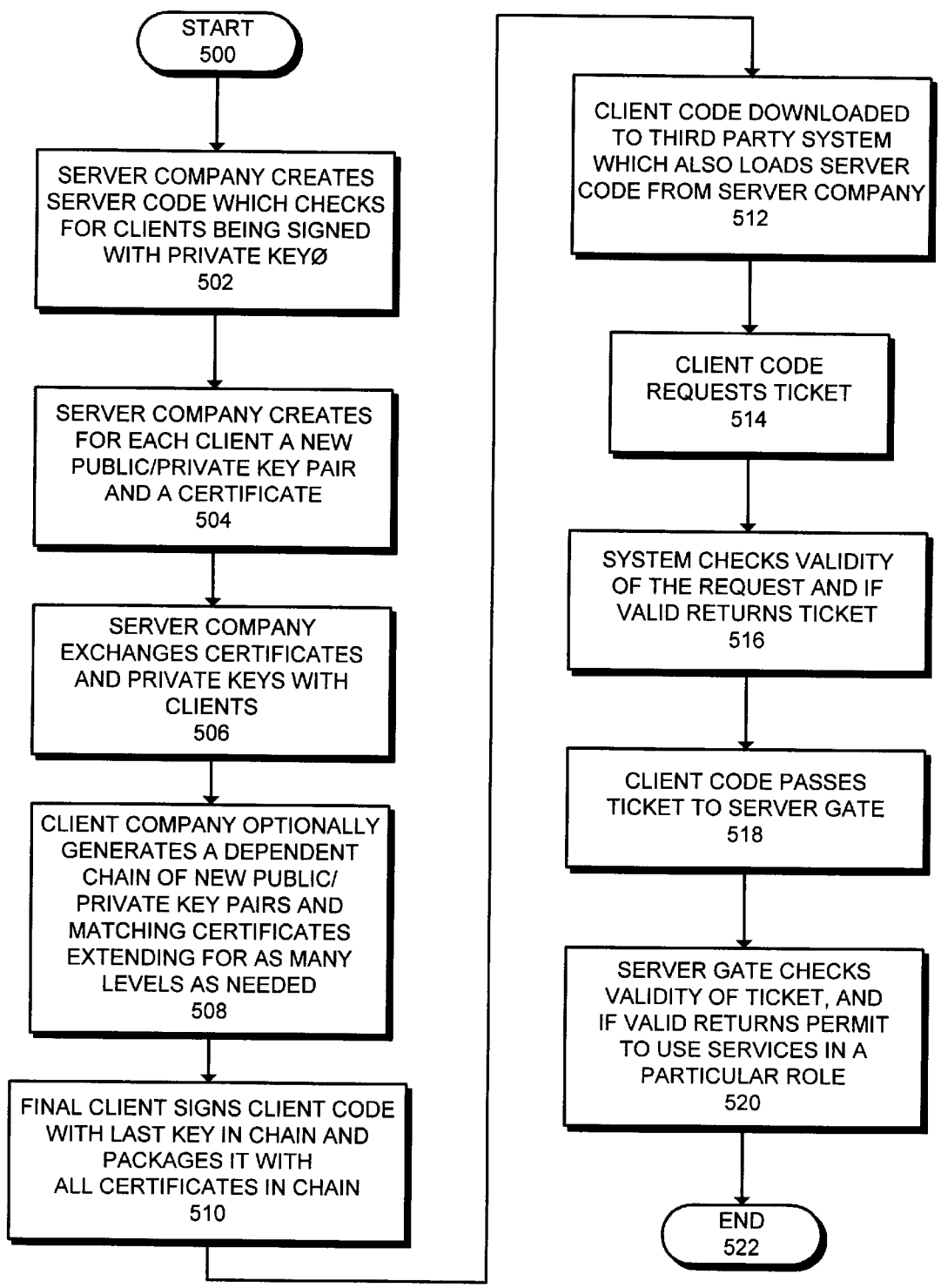
FIG. 5 is a flow chart illustrating how authorization to access a service is propagated, and is ultimately used gain access to the service, in accordance with an embodiment of the present invention.

FIG. 5 is a flow chart illustrating how authorization to access a service is propagated and is ultimately used gain access to the service in accordance with an embodiment of the present invention. The system starts at state 500 and proceeds to state 502. In state 502, server company 400 (from FIG. 4) creates server code 460, which checks for clients being signed with key zero. Key zero is associated with a particular role, which defines a set of services that may be performed in the role. The system next proceeds to state 504. In state 504, server company 400 creates for each client a new public/private key pair and a certificate. The system next proceeds to state 506. In state 506, server company 400 exchanges these certificates and private keys with the clients. This exchange may involve a transfer of money in payment for the use of the service or some other contractual consideration. The system next proceeds to state 508.

In state 508, each client company optionally generates its own public/private key pairs and matching certificates for each client code module that is to assume the role represented by key zero. This process may be repeated for numerous levels of clients and intermediaries until a final client that owns the client code is reached. The system next proceeds to state 510.

In state 510, the final client signs the client code with the last key in the chain and packages it with all certificates in the chain. The system next proceeds to state 512. In state 512, client code module 122 is downloaded to a third party system 140, which also loads server code module 112 from server company 400. The system then proceeds to state 514.

In state 514, the client code requests access to the service stored by the server code by requesting a ticket for a role from the system. This role specifies certain operations on the service. The system next proceeds to state 516. In state 516, the system checks the validity of the request. This is done by examining all certificates in the chain and the client code to ensure that the certificates and the client code are signed with the proper private keys. This is accomplished by using the corresponding public keys to verify signing by the corresponding private keys. If the request is valid, the system returns a ticket to the client.

The process of examining the chain of certificates may be carried completely by the server code, or completely by neutral code on the third party system. Alternatively, a portion of the examination can be carried out by the system code and a portion carried out by the neutral code. For example, the neutral code can examine all of the certificates except the first certificate, and the server code can examine the first certificate to verify that it is signed by private key zero. The system next proceeds to state 518. In state 518, the client code passes the ticket to server gate 202 (as was described above with reference to FIG. 2). Server gate 202 checks the validity of the ticket, and if valid, server gate 202 sends to the client code a permit to access the service through the role. The system next proceeds to state 522, which is an end state. The above-described process is repeated for each new server code module or client code module that the system desires to create.

Note that the above-described process that produces a permit for the client code is not strictly necessary, and may be dispensed with in certain situations. If accesses to the service are infrequent, the desired access can simply be performed without giving the client code a permit for successive accesses. Additionally, the permit does not have be passive. It may include, among other things, a mechanism to inactivate the permit after a certain time period, and a mechanism that maintains a log of uses of the permit. It may also include mechanisms to ensure the permit has not been revoked and to identify users of the permit.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is limited only by the appended claims.

What is claimed is:

1. A method for providing a first computer program module with an ability to access a service from a second computer program module, comprising:

receiving the first computer program module;

determining whether the first computer program module has been digitally signed by an authority having power to confer access for the service from the second computer program module;

if the first computer program module has been digitally signed by the authority having power to confer access for the service, providing the first computer program module with access to the service; and allowing the first computer program module and the second computer program module to run in the same address space on the same computing node, so that the first computer program module can access the service from the second computer program module.

2. The method of claim 1, wherein the act of determining whether the first computer program module has been digitally signed by the authority having power to confer access for the service, includes using a public key associated with the service to verify that the first computer program module has been digitally signed by a corresponding private key for the service.

3. The method of claim 1, wherein the act of determining whether the first computer program module has been digitally signed by the authority having power to confer access for the service, includes verifying that the first computer program module includes a chain of certificates establishing authorization for the service, a first certificate in the chain being signed by an entity that is originally authorized to confer access for the service, and subsequent certificates in the chain being signed by entities that have been delegated authorization to confer access for the service.

4. The method of claim 1, wherein the act of providing the first computer program module access to the service, includes providing the first computer program module with a permit that allows the first computer program module to perform a restricted set of services.

5. The method of claim 1, wherein the service is accessed through an object defined within an object oriented programming system.

6. The method of claim 1, wherein the first computer program module includes a Java Archive file.

7. The method of claim 1, wherein the first computer program module includes computer code and at least one digital certificate.

8. The method of claim 1, wherein providing the first computer program module with access to the service allows the first computer program module to interact with the second computer program module.

9. The method of claim 8, wherein the first computer program module originates from a first server and is transferred to a computer node for execution, and the second computer program module originates from a second server and is transferred to the computer node for execution.

10. The method of claim 8, wherein the first server and the second server computer are separately located from the computer node.

11. The method of claim 1, wherein the service includes a plurality of services.

12. A method for providing a first computer program module with an ability to access a service from a second computer program module, comprising:

receiving the first computer program module;

determining whether the first computer program module has been digitally signed by an authority having power to confer access for the service by verifying that the first computer program module includes a chain of certificates establishing authorization for the service, a first certificate in the chain being signed by an entity that is originally authorized to confer access for the service, and subsequent certificates in the chain being signed by entities that have been delegated authorization to confer access for the service;

if the first computer program module has been digitally signed by the authority having power to confer access for the service, providing the first computer program module with a permit that allows the first computer program module to perform a restricted set of services, including the service; and allowing the first computer program module and the second computer program module to run in the same address space on the same computing node, so that the first computer program module can access the service from the second computer program module;

wherein allowing the first computer program module to access the service allows the first computer program module to interact with the second computer program module.

13. The method of claim 12, wherein the service is accessed through an object defined within an object oriented programming system.

14. The method of claim 12, wherein the first computer program module includes a Java Archive file.

15. The method of claim 12, wherein the first computer program module originates from a first server and is transferred to a computer node for execution, and the second computer program module originates from a second server and is transferred to the computer node for execution.

16. The method of claim 15, wherein the first server and the second server computer are separately located from the computer node.

17. A computer readable storage medium storing instructions that when executed by a computer cause the computer to perform a method for providing a first computer program module with an ability to access a service from a second computer program module, comprising:

receiving the first computer program module;

determining whether the first computer program module has been digitally signed by an authority having power to confer access for the service from the second computer program module;

if the first computer program module has been digitally signed by the authority having power to confer access for the service, providing the first computer program module with access to the service; and allowing the first computer program module and the second computer program module to run in the same address space on the same computing node, so that the first computer program module can access the service from the second computer program module.

18. A method for providing a first computer program module with an ability to access a service from a second computer program module, comprising:

a receiving means, for receiving the first computer program module;

a verification means, for verifying that the first computer program module has been digitally signed by an authority having power to confer access for the service;

an access means, for providing the first computer program module with access to the service if the first computer program module has been digitally signed by the authority having power to confer access for the service; and an execution means, that allows the first computer program module and the second computer program module to run in the same address space on the same computing node, so that the first computer program module can access the service from the second computer program module.

19. An apparatus that provides a first computer program module with an ability to access a service from a second computer program module, comprising:

a computer node;

a receiving mechanism, within the computer node, that receives the first computer program module;

a verification mechanism, within the computer node, that verifies that the first computer program module has been digitally signed by an authority having power to confer access for the service;

an access mechanism, within the computer node, that provides the first computer program module with access to the service if the first computer program module has been digitally signed by the authority having power to confer access for the service; and an execution mechanism, within the computer node, that allows the first computer program module and the second computer program module to run in the same address space on the same computing node, so that the first computer program module can access the service from the second computer program module.

20. The apparatus of claim 19, wherein the verification mechanism is configured to use a public key associated with the service to verify that the first computer program module has been digitally signed by a corresponding private key for the service.

21. The apparatus of claim 19, wherein the verification mechanism is configured to verify that the first computer program module includes a chain of certificates establishing authorization for the service, a first certificate in the chain being signed by an entity that is originally authorized to confer access for the service, and subsequent certificates in the chain being signed by entities that have been delegated authorization to confer access for the service.

22. The apparatus of claim 19, wherein the access mechanism is configured to provide the first computer program module with a permit that allows the first computer program module to perform a restricted set of services.

23. The apparatus of claim 19, wherein the service is accessed through an object defined within an object oriented programming system.

24. The apparatus of claim 19, wherein the first computer program module includes a Java Archive file.

25. The apparatus of claim 19, wherein the first computer program module includes computer code and at least one digital certificate.

26. The apparatus of claim 19, wherein the receiving mechanism is configured to transfer the first computer program module from a first server, and to transfer the second computer program module from a second server.

27. The apparatus of claim 26, wherein the first server and the second server are separate from the computer node.

28. The method of claim 26, wherein the service includes a plurality of services.

29. A computer readable storage medium containing a first computer program module which is able to access a service from a second computer program module, comprising:

a computer code section, including computer code for execution on a computer node to carry out functions of the first computer program module; and a digital signature section, including a chain of certificates establishing authorization for the service, a first certificate in the chain being signed by an entity that is originally authorized to confer access for the service, and subsequent certificates in the chain being signed by entities that have been delegated authorization to confer access for the service, the digital signature section allowing the computer node to determine whether the computer program module has been granted authority to access the service.

\* \* \* \* \*